United States Patent [19]

Lerner

[11] Patent Number: 5,110,325
[45] Date of Patent: May 5, 1992

[54] RECYCLE SPRAY GAS-LIQUID CONTACTOR

[76] Inventor: Bernard J. Lerner, 727 Orchard Hill Dr., Pittsburgh, Pa. 15238

[21] Appl. No.: 688,439

[22] Filed: Apr. 22, 1991

Related U.S. Application Data

[63] Continuation-in-part of Ser. No. 512,214, Apr. 20, 1990, Pat. No. 5,024.686.

[51] Int. Cl.$^5$ .............................................. B01D 47/00
[52] U.S. Cl. .......................................... 55/90; 55/233; 55/259; 261/118
[58] Field of Search .......................... 55/233, 259, 90; 261/118

[56] References Cited

U.S. PATENT DOCUMENTS

5,024,686  6/1991  Lerner .................................. 55/259

Primary Examiner—Bernard Nozick
Attorney, Agent, or Firm—Olin E. Williams

[57] ABSTRACT

This invention relates to a novel gas-liquid contacting apparatus and method utilizing recycle spray contact trays disposed within a substantially vertical vessel. Each contact tray contains one or more housings defined by upstanding vertical wall members, said housings being open to gas flow at top and bottom. Within the housings, liquid spray is continuously generated by means of gas flowing upward past a first array of horizontally spaced-apart gas venturi-generating liquid conductors. Liquid flows from the tray floor outside the housing through the liquid conductors, is distributed into the gas, and is entrained upward as spray by the gas venturi action. Horizontally-disposed foraminous or perforated flow-restrictive elements, vertically spaced apart, mounted on top of the housings, cause the liquid spray to coalesce and regenerate at the first flow-restrictive barrier element which occupies the cross-sectional area of the vertical housing. A major portion of the gas and contained spray is then caused to flow laterally, normal to the upward gas flow direction, through the high-voidage space between the elements. The flow-restrictive elements are comprised of foraminous or perforated plates, or anisotropic material such as layered mesh. The spray issuing laterally impinges on the vessel walls and liquid therefrom drains downward or falls by gravity to the tray floor, where the process is repeated. The method of invention encompasses spray contacting with automatic and continuous recirculation of liquid spray in a controlled manner at rates that are multiples of the liquid throughput rate, and is capable of operation at high has velocities and low pressure drop.

5 Claims, 3 Drawing Sheets

RECYCLE SPRAY GAS-LIQUID CONTACTOR

FIELD OF THE INVENTION

This invention consists in a Continuation-in-Part of Lerner Application Ser. No. 07/512,214 filed Apr. 20, 1989 now U.S. Pat. No. 5,024,686, and relates to method and apparatus for improved gas-liquid contacting and mass transfer and in particular provides for multiple cocurrent gas-liquid spray contacts under net countercurrent gas/liquid flow conditions, with continuous spray generation, liquid collection and recycle, solely by means of gas flow and without the intervention of external mechanical means. Still more particularly, this invention relates to apparatus comprising layers of foraminous flow-permeable flow-restrictive elements and to method for obtaining liquid spray recirculation rates that are multiples of tray liquid throughput rates, said method and apparatus being capable of operation at high gas velocities with low pressure drop.

BACKGROUND OF THE INVENTION

Countercurrent mass transfer methods, such as distillation or absorption, are normally carried out in apparatus employing liquid gravity downflow or crossflow in contact with an upward flow of gas. Conventionally, such contact is carried out either stagewise, employing a variety of liquid-gas contacting trays, or in so-called differential contacting equipment, such as packed towers.

A large variety of contacting trays are known to the art, mainly comprising bubble cap or sieve trays, wherein liquid flows horizontally across each contact tray in crossflow relation to the gas flowing generally vertically upward through the tray. In such conventional contacting trays, intimate gas-liquid contact is secured by bubbling the gas through the liquid on the tray and generating a bubble froth.

On conventional bubble-cap and sieve trays, liquid droplet spray or entrainment is known to be incidentally generated. Such spray carryover is known in the art as "liquid-in-gas" entrainment. This entrainment is considered to be undesirable in stage-wise, countercurrent, liquid-gas contact, because spray carryover of liquid from one tray to the contact tray above short-circuits the desired progression of tray-to-tray liquid/gas concentration gradients. The prior art has attempted to solve this problem in various ways. For example, Kiselev, in U.S. Pat. No. 4,820,456, uses perforated plate froth retainer cells to generate a fine foam in order to blanket the turbulent liquid and inhibit entrainment carryover to the tray above.

In some mass transfer methods, where a significant portion of the total transfer resistance lies in the liquid phase, spray contacting may be desirable. Examples of such processes include the de-aeration of boiler feed water, stripping of volatile organic contaminants from contaminated water and absorption of highly-soluble gases. These, and other similar processes, are characterized by the fact that the overall transfer rate is controlled by liquid-phase or liquid-film diffusion rates, which are intrinsically slower than gas-phase diffusion rates. The minimization of such resistance requires the maximum degree of continuous mixing of the liquid phase. However, spray contactors do not normally provide for optimum or continuous mixing of the liquid phase, and therefore have not been widely used industrially for gas-liquid mass transfer operations.

In a spray contactor, the major fraction of the total mass transfer of a solute from a gas to a liquid, or from the liquid to the gas, occurs during drop formation in the vicinity of the spray nozzles. During drop formation, the liquid is in generally turbulent sheet or jet flow. Once the liquid drops are formed, they mix internally by oscillation for a brief period and subsequently behave more or less like rigid spheres, with no further internal mixing. Within a liquid drop, liquid phase transfer in the absence of internal mixing is a slow diffusion-controlled process which yields very low overall transfer rates. This absence of internal stirring or mixing following drop formation is one of the major disadvantages of conventional single-stage spray contact devices.

One method of achieving liquid mixing following the formation of liquid drops is to collect, or coalesce, the drops into bulk liquid form and then reform the drops. Prior art methods for drop collection and spray regeneration have generally involved some external mechanical device, such as a recycle pump and spray nozzles. Mechanical pumping to secure spray regeneration is energy-intensive and is not economical where a number of contact stages is required.

Such prior art spray contactors that rely on mechanical means of controlled spray liquid capture and recycle include Herrlander, U.S. Pat. No. 4,514,196, which utilizes a contact tray containing a plurality of separate venturi tubes with a spider-arm liquid distributor, with one liquid tube feeding each individual venturi. The gas venturis generate upward liquid spray. The liquid spray is intercepted by a bed of balls where secondary bubble flow contacting is secured. There is no internal recycle of liquid; passage of liquid is essentially once-through. In another example, Ekman, U.S. Pat. No. 3,795,486, teaches the use of a series of spaced-apart cylindrical rods with spray injected either from above or below into vertical gas upflow. The flow of liquid is "downwardly counter-current" to gas flow through the vessel containing the series of spaced-apart rods. The combination of rod spacing and gas velocities used by Ekman yields downward cascading of liquid through the rod arrays and generally countercurrent liquid/gas flow. Andersen, U.S. Pat. No. 3,447,287, effects once-through passage of smoke and spray through an array of rods in order to obtain particulate collection. In Ekman, U.S. Pat. No, 4,140,501, gas flows horizontally through a single row of spaced-apart vertical or inclined venturi-forming tubes. The tube array is face-sprayed by an upstream spray nozzle cocurrent with gas flow, and the spray which is entrained downstream is removed by a series of progressively finer vane demisters. Demisted liquid is drained from the system, and there is no teaching in Ekman of liquid recycle. In all of these cases of the prior art, liquid spray generation and/or collection is random and uncontrolled other than by gravity. There is no means provided for control of, or internal recycle of, the spray liquid. In neither Ekman or Andersen is there any teaching of a method or means for internal spray collection, directed external flow and automatic regeneration of spray recycle of liquid in a controlled, repeated, manner.

In Lerner, U.S. Pat. No. 4,732,585, spaced apart perforated or foraminous tubes, closed at the ends, are used in a baffle-and-tube array to cause liquid in the tubes to go into bubbling flow. Gas-liquid contacting is by means of bubbling flow, with spray injected above the array, and liquid draining downward from the bubble tubes. Lerner provides no method or means for internally-controlled liquid recycle and spray regeneration.

OBJECT OF THE INVENTION

It is an object of this invention to provide an improved method and apparatus for gas-liquid contacting. It is another object of this invention to provide a liquid-spray gas-liquid contact apparatus of increased efficiency, in which the liquid is internally recycled into contact with gas flow at high liquid/gas ratios and low gas pressure drop without the use of mechanical means to achieve such recycle. It a is still further object of this invention to generate spray, cocurrently contact gas therewith, and to collect, recycle and regenerate spray on one or more contact trays, arranged in series, using only the gas flow energy for spray generation, capture and recycle. It is a further object of this invention to generate spray on the contact tray or trays at spray rates that are multiples of the liquid feed rate through the tray or tower containing a plurality of trays. It is a still further object of this invention to provide an effective apparatus for, and method of, cocurrent gas-liquid spray contacting, under net countercurrent stage-wise gas/liquid flow conditions, that are capable of operating at high gas velocity and low pressure drop.

SUMMARY OF THE INVENTION

The method of the present invention is carried out in a substantially vertical vessel containing one or more gas-liquid contact trays. Each contact tray is comprised of a substantially horizontal plate with upstanding wall members fastened to the plate, said wall members defining within said vessel one or more vertically-walled housings open to the upflowing gas at both top and bottom. The housing contains a first or bottom array of horizontally-disposed, spaced-apart parallel liquid conductors open at one or both ends, which penetrate the vertical walls of the housing and communicate with a liquid layer on the tray floor external to said housing. The said conductor tubes are preferably cylindrical or tubular, or sections thereof, and are so spaced apart as to generate venturi flow in the upflowing gas passing through the internal box formed by the walled housing, and through the array of said liquid-conducting tubes. The said liquid-conducting venturi tubes contain suitable distributor means such as overflow weirs or orifices for uniformly dispersing the liquid in the gas venturi flow formed external to the tubes. In the method of this invention, the gas is caused to flow at sufficiently high velocities through the housing to both generate spray at the areas of introduction of liquid from said liquid-conductors, acting also as venturi-generating tubes, and to entrain upwardly substantially all of the spray so formed.

The spray conveyed cocurrently upward by the gas flow is intercepted by a series of two horizontally-disposed, vertically spaced apart, foraminous or perforated flow-restrictive elements. The flow-restrictive elements form a first and second zone of flow resistance normal to the upflow gas direction, and are separated by at least partially open-sided free space between the resistance elements. The first flow-restrictive foraminous barrier is mounted on top of the vertical-walled housing, and occupies the cross-sectional area of the vertical housing, causing all of the gas and spray to flow through this barrier. The second foraminous flow resistance barrier is preferentially secured to, or is otherwise integral with, the first resistance element.

It has been discovered that, surprisingly, when the inter-element void space is open to the volume external to the housing, a significant fraction of the gas flow by-passes laterally, that is, normal to the gas flow direction, through the free void space between the flow-restrictive elements. The spray that is carried upward by the gas through the first resistance layer or zone is ejected laterally through the void space between the first and second flow-resistance zones.

Pressure drop measurements have shown that the lateral conduction of the gas between the initial flow-restrictive barrier and the second spaced-apart barrier is induced because the gas pressure differential across the secondary flow-restrictive barrier in the direction of vertical gas flow is greater than the pressure differential between the gas between the flow-restrictive barriers and the gas outside the housing. Because the gas flow takes the path of the least flow resistance, the major part of the gas is forced to flow laterally between the flow resistances, carrying the entrained spray with it. Suitable flow-restrictive elements have been found to be foraminous or perforated plates or tubes, or anisotropic material such as layered mesh.

In one embodiment of this invention, the flow restrictive primary and secondary elements are formed by the lower and upper surfaces of a single row of perforated or foraminous hollow tubes which are open at one or both ends, and are contiguously arranged, preferably in substantial contact with one another. Although all of the gas flows initially through the first resistance barrier, comprising the bottom surfaces of the foraminous tubes, it is observed that a significant portion of the gas flows from the interior of the tubes horizontally through the tubes to the tower shell volume external to the vertical housing. This portion of the gas stream that flows horizontally through the spray interceptor tubes carries the major portion of the spray into the space between the vertical walled housing and the outer cylinder.

The optimum degree of lateral flow in the foraminous tubes is obtained when the tubes are arranged alongside one another, that is, parallel and in substantial contact with each other. The intercepted spray is ejected along with the gas flow through the tubes normal to the initial spray direction developed by the gas venturi action at the liquid-conductor tubes. The horizontally-ejected spray falls by gravity or is caught by the walls of the cylindrical vessel and the liquid therefrom drains to the liquid pool on the floor of the tray where it re-enters the liquid-conducting tubes on the tray floor and is thus caused to recycle. The gas disengaging from the liquid combines with the gas penetrating the flow-restrictive elements and the total gas stream flows through the next-above array of conductor tubes or to the exit from the vertical cylindrical vessel. This invention thus provides a cycle of continuous spray generation, redirection of the spray normal to the gas flow direction, collection of the laterally-moving spray on the vessel walls or on special vertical collection plates, collection of the liquid by gravity drainage, and regeneration of spray from the recycled liquid. Although liquid flow is countercurrent to the gas flow in the column, gas/liquid spray contact is entirely cocurrent within the walled housing on the contact tray and liquid recycles on the tray in a closed-loop manner. The liquid spray cycle on the tray may be compared to an internal flywheel, with the net flow from plate to plate being the throughput liquid rate.

The spray collection and redirection cylinders may be of perforated or foraminous construction (wire mesh, expanded metal or plastic, screen, lattices, perforated tube or pipe, and the like) having from 25 to 90% open area, and preferably from 40 to 80% open area. For relatively large trays, or for multicompartment trays, the spray collection cylinders are preferably closed at one end, causing gas flow and liquid ejection from the opposite end. Such closed-end cylinders may be oriented all in one direction, so that the liquid flow ejects all in one direction, or the closed end of the cylinders may be alternated, causing simultaneous ejecta flow to opposite sides of the housing.

In another embodiment of this invention, the first and second flow-restrictive barrier elements are comprised of the upper and lower layers of an anisotropic, layered material such as knitted-mesh which has lower gas flow resistance laterally than vertically. Other suitable foraminous barrier materials include layers of woven wire or plastic filament screens or grids. If layers of screen or mesh are used it is preferable that these be crimped or otherwise vertically spaced apart to provide for anisotropically higher voidage and lower flow resistance in the horizontal direction than in the vertical direction.

To secure both the initial entrainment and the reentrainment of recycle liquor, the recycle liquid conductors of the assembly are preferably comprised of cylinders or cylindrical sections so spaced-apart as to generate a venturi effect in the gas stream flowing between them sufficiently large to aspirate liquid introduced to the gas in the upward direction. The liquid conductor/gas venturi-forming tubes may be open half-tubes or troughs from which liquid overflows by weir action into the gas venturi streams passing between them, thus allowing liquid spray to be aspirated upward by means of the gas venturi action. Alternatively, the venturi feed tubes may be fully cylindrical tubes with perforations, weirs, slots, nozzles, or other means known to the art for overflowing or injecting liquid. To maximimize spray generation, the means of liquid feed into the gas is preferably so arranged as to feed liquid into the gas stream in a direction substantially normal to the gas flow.

When upper and lower layers of anisotropic layered material such as screens or grids are used for the flow-restrictive elements, these are most advantageously flow-oriented with respect to the liquid flow across the tray floor by sealing one or more selected sides of the anisotropic layered material so as to secure the highest degree of liquid recycle and retention time on the tray, that is, the least degree of short-circuiting of the laterally-directed spray to the liquid overflowing to the tray below. For example, when liquid is introduced to the tray floor on one side of the tray, and the downcomer is 180° from the liquid entry, with the liquid conducting tubes arranged parallel to the general liquid flow direction, the spray collection-recycle layers may advantageously be open at substantially right angles to the venturi-generating liquid conductor tubes. Alternatively, the degree of liquid recycle may be maximized and the extent of liquid short-circuiting to the tray overflow may be minimized by placing both the venturi tubes and the open spray channels at right angles to the liquid flow direction on the tray from the feed weir to the downcomer. In this latter case, the venturi tubes are parallel to the open spray channels of the foraminous layered mesh or tubes. If it is desired to recycle the spray directly back to the venturi tube liquid inlet side, the open spray channels may be aligned parallel to the liquid-conducting venturi tubes, and closed off on the end of the housing on the side of the downcomers to the tray below. One means of sealing selected sides of the spray channels in the foraminous media is by upward extension of the sides of the vertical housing to block off the selected sides of the spray channels. In those cases where a cross-flow liquid gradient is desired, multiple vertical compartments may comprise the tray contacting means, with directed liquid ejection from the spray channels to the upstream side of net liquid flow across the tray, or to the 90°/270° sides of the flow direction across the tray. Thus, preferential lateral spray flow directional control may be provided for in the use of foraminous layered material as the flow-restrictive flow resistance elements by sealing or blocking one or more sides of the layered array.

The liquid conducting tubes are preferably located at or near the tray floor, and the liquid level on the tray is maintained at sufficient depth to cause the liquid to flow through the tubes at a desired rate. The liquid level may be maintained at the desired levels by conventional means such as an overflow pipe or weir downcomer. If fully submerged liquid conducting tubes are employed, it is preferable to have flow-restrictive liquid introduction means such as slots or orifices, so that the liquid rate of introduction to the gas may be controlled by means of the external hydrostatic head on the tray.

BRIEF DESCRIPTION OF THE DRAWING

A preferred embodiment of the invention, both as to apparatus and the method of its operation is described with reference to the drawings, of which.

DETAILED DESCRIPTION OF THE DRAWINGS

Figure 1:
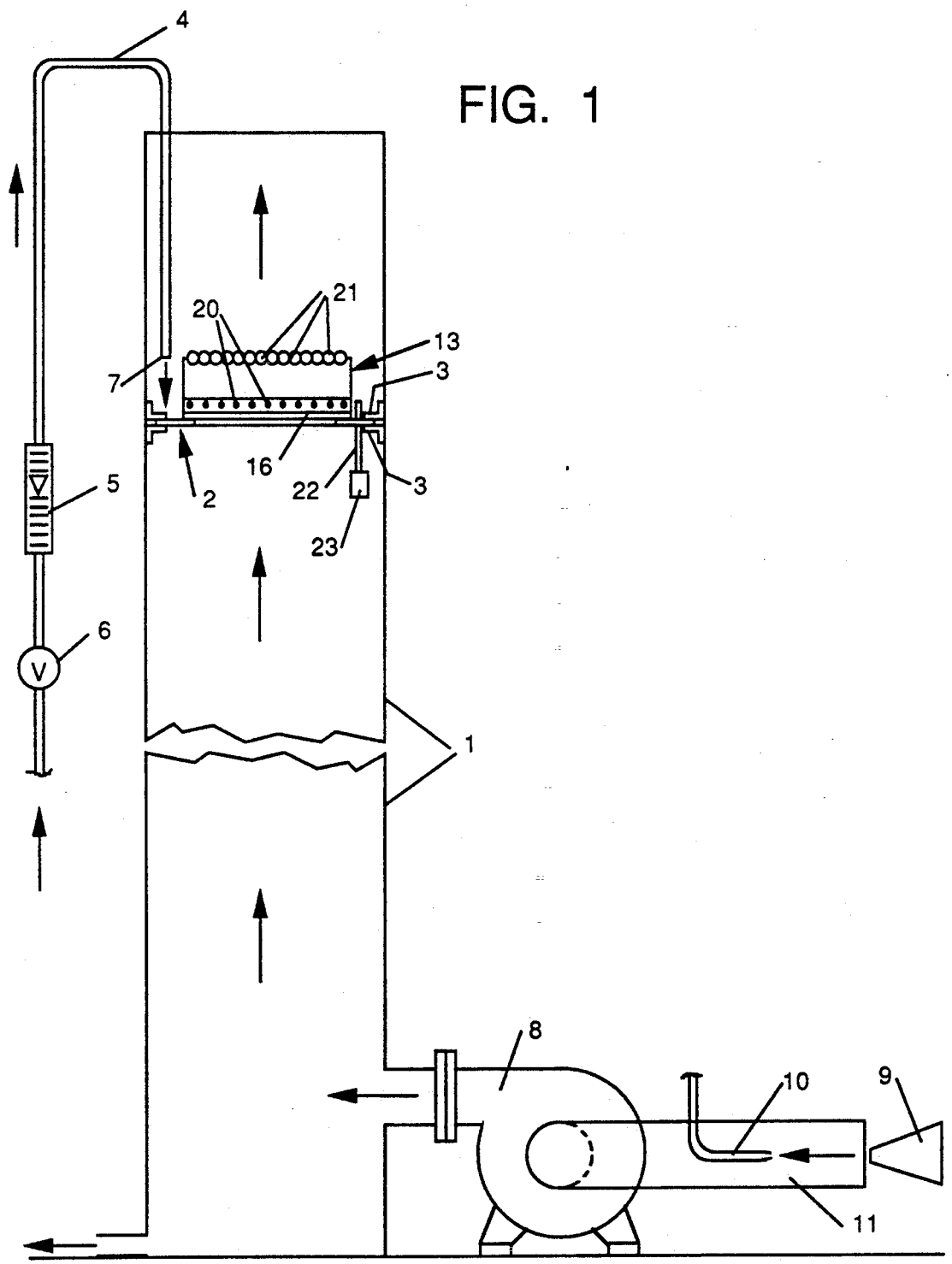
FIG. 1 is a diagrammatic elevational view of a preferred embodiment of the invention with parts broken away to show details of the preferred apparatus.

With reference FIG. 1 cylindrical tower 1 encloses and supports a horizontal contact tray 2 held between flanges 3 of the tower 1. Water or other liquid is fed to the tray 2 through conduit 4 and through a flowmeter 5 and control valve 6 to a tray inlet feed point 7. Air or other gas is blown up through the tower by means of a centrifugal blower 8. The gas flow rate is controlled by a throttling damper 9 on the blower inlet and metered by means of a pitot tube 10 in suction flow duct 11.

Figure 2:
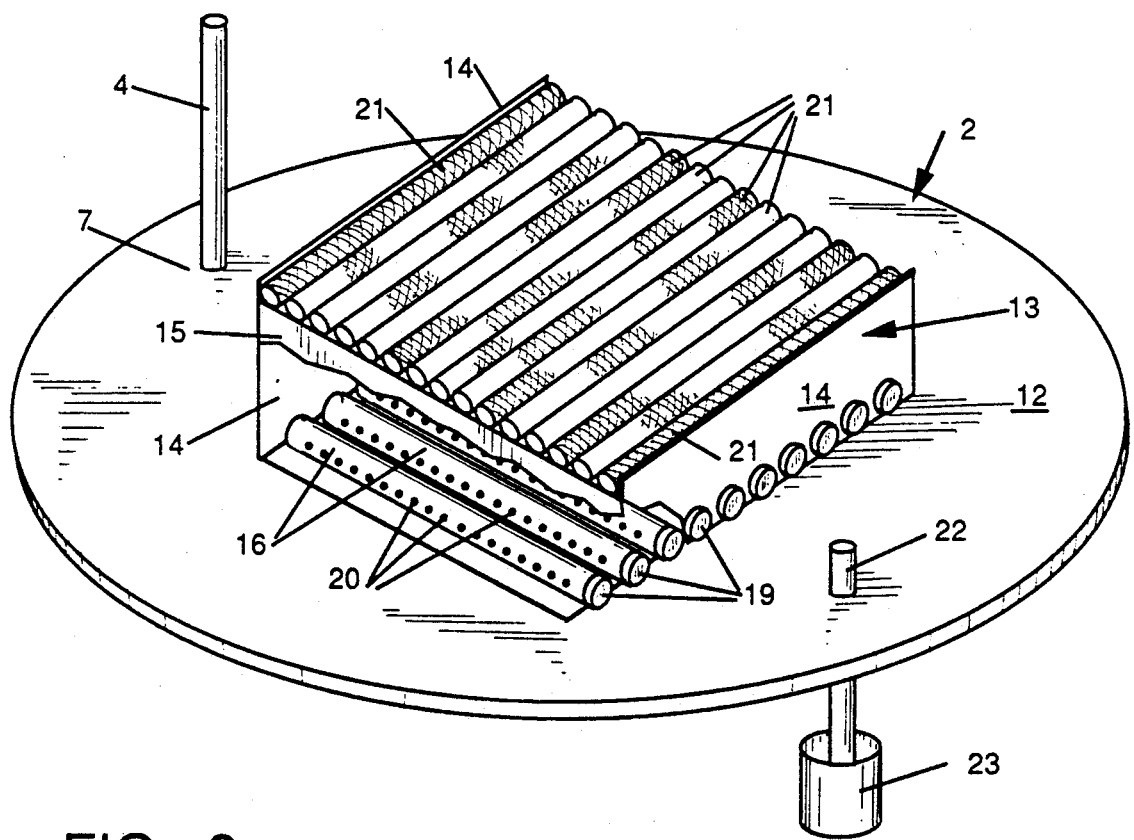
FIG. 2 is a view of one apparatus of the invention in which the method of this invention is practiced.

With reference to FIG. 2, the contact tray 2 consists of a circular plate 12 containing a vertically-walled rectangular housing 13 in open cross-section, one set of opposing sides 14 of the housing being slightly higher than the other set of opposing sides 15.

A horizontal array of spaced-apart venturi tubes 16 are supported in opposing sides 14 with their bottom edges at, or slightly above, the surface of the tray floor 12. The liquid-conducting venturi tubes 16 extend through the side walls 15 of the housing 13. The liquid-conducting venturi tubes 16 are plugged off on the downcomer side 19 so that liquid flowing off the tray floor can enter the tubes only on the side adjacent to the feed inlet point 7. Each of the venturi injection tubes 16 contains a row of holes 20 on each side, each row being horizontally disposed and evenly spaced 180 degrees apart, allowing liquid to be injected into the gas at right angles to the vertical gas upflow direction.

A single row per tray of open lattice-work foraminous tubes 21 are arranged in an array at the top of the open vertical housing 13 in a direction normal to the venturi injection tubes 16. Each end of the foraminous tubes 21 rests on the top edge of low sides 15 of the vertical housing 13. The contact box walls 14 on the two sides parallel to the length of the foraminous tubes 21 extend from the bottom of the tray floor 12 to slightly above the center of the row of foraminous tubes 21.

The foregoing arrangement directs the spray issuing from the foraminous, or spray recycle, tubes 21 at right angles to the general liquid crossflow direction across the tray. The tray floor 12 contains a single downcomer 22 consisting of an overflow cylindrical drain extending some inches, for example, 2 to 4 inches, both above and below the tray floor 12. The height of the downcomer pipe 22 above the tray floor provides a constant hydrostatic head for the venturi injection tubes 16. To provide a positive seal against gas entry, the downcomer is equipped with a seal cup at the bottom. As shown in FIG. 2, the downcomer is preferably located 180 degrees from the liquid inlet.

Figure 3:
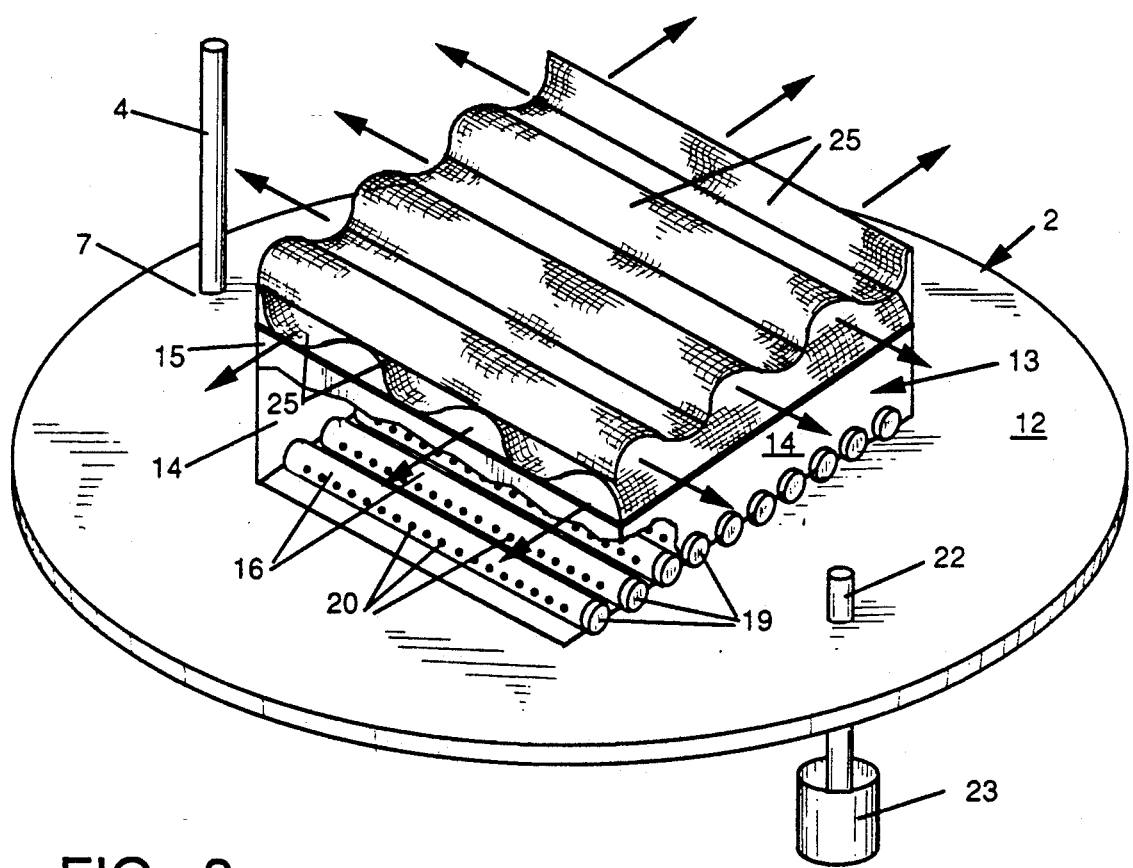
FIG. 3 is a fragmental isometric view of an alternative element of this invention.

An alternative form of flow-restrictive foraminous element to that shown in FIG. 2 as foraminous tubes 21 is shown in FIG. 3. The flow resistant element 25 consists of a plurality of crimped screens or layers of wire mesh horizontally arranged, in which the channels between the screens provide horizontal passages of high voidage and low flow resistance. In order to clearly show the anisotropic layered material having low flow resistance in the horizontal direction relative to the flow resistance in the vertical direction, the horizontal screen structure is shown apart from the scrubber-tower 1 and associated structure. The horizontal crimped screen or mesh structure rests on the edges of the vertical walled rectangular housing 13 in the same manner as do the aforesaid foraminous tubes 21. In order to provide for directed spray and gas flow, the horizontal screen structure can be open along its edges to the space between the housing on from one to four sides. The preferred mode of directed spray recycle at right angles to the locations of the liquid inlet weir and downcomer may be obtained by leaving the corresponding opposite edges of the horizontal mesh structure open while the other two sides adjacent to the respective liquid inlet weir and downcomer are closed by the alternately higher walls of the housing 13.

SPECIFIC EXAMPLE 1

An 11½ i.d. acrylic tube was used as housing 1 so that the gas-liquid interaction could be visually observed. The contact tray 2 of this invention was held between flanges 3 of the acrylic housing. Water was fed to the tray through conduit 4 through a flowmeter 5 and control valve 6 to the tray inlet feed point 7.

Air was blown up through the housing 1 by means of a centrifugal blower 8. The air flow rate was controlled by means of a throttling damper 9 on the blower inlet and metered by means of a pitot tube 10 in a 4-inch diameter suction flow duct 11.

With reference to FIG. 2, the contact tray was comprised of a circular plate 12 containing a vertically-walled square housing 13, 6 inches ×6 inches in open cross-section, 3¼ high on one set of opposing sides, and 4" on the other set of sides 15. The air velocity through the vertical square test section defined by housing 13 was calculated from the ratio of the respective air flow cross-sectional areas of the suction duct 11 and the said square test section.

Three (3) nominal 1" diameter polypropylene pipes 16 were used as the spaced-apart venturi injection tubes 8 with their bottom edges ¼ above the surface of the tray floor 4. The liquid-conducting venturi tubes 16 projected through the 4" side-walls of the housing 15. The liquid-conducting venturi tubes 16 were plugged off on the downcomer side 19 so that liquid flowing off the tray floor could enter the tubes only from the side adjacent to the inlet feed point 7. Each of the three venturi injection tubes contained ten (10) 3/32" holes 20, five on each side, horizontally disposed and evenly spaced 180° apart, allowing water to be injected into the gas at right angles to the vertical gas upflow direction.

A single row of five (5) 1⅜ diameter, 6½ long, extruded, open latticework, polypropylene tubes 21, commercially available under the name of "Vexar" tubing, were arranged in a contiguous array at the top of the open vertical housing 16, in a direction normal to the venturi injection tubes. The bottoms of the Vexar tubes were in tangent contact with the 3¼ high sides 14 of the vertical housing normal to the length of the perforated tubes. The contact box walls 15 on the two sides parallel to the length of the Vexar tubes extended 4 inches above the bottom of the tray floor 12 and slightly above the center of the row of the Vexar tubes 21. This arrangement directed the recycle liquid issuing from the spray recycle tubes at right angles to the general liquid crossflow direction across the tray. The tray floor 12 contained a single downcomer 22 comprising an overflow 1" diameter cylindrical drain, extending 2¼ above the floor of the tray 12, and 3 inches below the tray. The height of the overflow (downcomer) pipe 22 above the tray floor was 2¼, thus providing a constant hydrostatic head for the venturi injection tubes 16. To provide a positive seal against gas entry, the downcomer was equipped with a seal cup 23 at the bottom. The downcomer was located 180° from the water inlet.

Average liquid residence times on the tray were measured by injecting four (4) drops of green food coloring dye into the water inlet 7 over a period of 16 seconds, and then timing the interval for the color to visually disappear from the liquid in the region of the tray downcomer 22. Two sets of comparative retention time runs were made: (a) with air flow and venturi tube/foraminous tube liquid spray recycle at a liquid throughput rate of 0.5 GPM, and (b) with no air flow and a 0.5 GPM liquid throughput, but with the venturi tube entrances plugged. Four dye disappearance time tests were made at each of the two conditions (a) and (b), and the times were averaged to obtain a mean.

The reference runs, made with 0.5 GPM liquid flow across the tray, but with no air flow, and with the liquid-conducting venturi tube liquid entries plugged, gave an average dye disappearance time of 98 seconds. A theoretical liquid residence time, assuming plug flow and no mixing, was derived from measurement of the volume of liquid on the tray external to the 6"×6" venturi/spray recycle box. The water depth at 0.5 GPM liquid flow at condition (b) zero gas rate, with the venturi tubes plugged, was measured as 2-5/16". The volume of the liquid retained on the tray was calculated from this depth as 0.647 gallons. Dividing this value by the 0.5 GPM flow rate gave a theoretical no-mixing residence time of 78 seconds. The experimentally-measured reference dye residence time of 98 seconds was therefore only 20 seconds longer than the plug-flow residence time.

With air flowing through the open 6"×6" square section at a velocity of 715 feet per minute, at a gas pressure drop through the contact stage of 1.3 inches water column, the average time for dye disappearance was 286 seconds. This value was 3.46 times the theoretical plug-flow time and 2.88 times the measured dye residence time without recycle. The spray recycle rate was therefore 2.9 times the liquid throughput rate. Inasmuch as the liquid throughput rate was 0.5 GPM, the measured 2.9 recycle ratio meant that the spray recycle rate was 1.44 GPM. The 6"×6" gas flow cross-sectional area was 0.25 square feet, so that the spray recycle rate was 5.76 GPM/square foot, which is an relatively high value. It should be noted that this area flow rate is typical of throughput rates for packed tower contactors, but in the case of the present invention, this rate is a liquid drop spray rate, wherein the liquid drops have an intrinsically greater contact area than the falling film of the packed tower.

SPECIFIC EXAMPLE 2

The spray recycle rate is a function of the liquid injection rate from the liquid-conducting venturi tubes and the entraining gas velocity. The injection rate of liquid from the liquid conductor tubes can be controlled by the size and number of the injection orifices or overflow weirs, and their number and location in the initial design. In order to explore the spray recycle range of the apparatus of this invention, the apparatus of Example 1 was used with a set of different venturi injection tubes. The substituted injector tubes were comprised of three (3) of the 1⅜ diameter, polypropylene, "Vexar" tubes used as interceptor tubes in Example 1. The bottom half of the tubes were sealed with pressure-sensitive aluminum foil to convert each tube into the equivalent of V-notch overflow weirs of high liquid flow capacity. At a gas velocity through the vertical housing of 375 fpm and liquid throughputs of 1.0 GPM, 2.0, 2.5 and 10 GPM, intense liquid recycle rates, visually estimated at between 10 and 30 GPM by comparison with the observations and direct measurements of Example 1, were observed. The liquid recycle rates were proportional to the submergence of the overflow weir, which varied from negligible at 1.0 GPM throughput to 3¾ at 10 GPM throughput. Corresponding tray pressure drops at a gas velocity of 375 fpm varied from 1.65" W.C. at 1.0 GPM throughput to only 2.6" W.C. at 10 GPM throughput. Spray recycle ratios were visually in the range of 20 to 1 at the lower throughputs to 3 to 1 at the higher throughputs. Varying gas velocity tests at a constant liquid throughput rate of 1.0 GPM showed that the operation of the tray was completely stable below a velocity of 1200 fpm at which the pressure drop was about 4" W.C.. Above 1200 fpm at a liquid throughput of 1.0 GPM, surging was noticeable in the gas flow, and flooding was observed at about 1500 fpm.

These tests demonstrated that the liquid injection and recycle rate can be made a function of the liquid throughput rate by sizing the plate overflow tubes so that they are submerged at the desired throughput rate. This mode of operation is preferred where it is desired to keep recycle spray rates proportional to throughput, so that substantially constant efficiency is obtained over a varying liquid throughput range. Such a characteristic, known to the art as "wide turndown ratio" is highly desirable in most distillation and absorption applications.

The tests of Example 2 also demonstrate that overflow weir submergence, matched to high-capacity liquid injection venturi tubes, yields control of the recycle ratio. High ratios of recycle spray rates to liquid throughput rates are of particular advantage in gas absorption or description, where coefficients of mass transfer increase with increasing liquid/gas ratios. The higher ratios observed in these tests are not possible in contacting equipment such as packed towers because of the limitations of flooding in countercurrent flow. The advantages of the high liquid/gas ratios would also apply to instances where a long residence time under efficient contacting conditions per unit liquid throughput is required. Examples of this type of application is the stripping of dissolved gases, and the removal of partially-soluble organic compounds, such as phenol and tert-methyl butyl ether, from contaminated groundwater.

The observed dependence of liquid recycle rate on the tray on gas velocity is fundamentally unique. Essentially, the tray is self-adjusting in terms of liquid/gas ratio. That is, an increase in gas velocity increases the venturi aspiration rate and thus the liquid spray recycle rate. Conversely, a decrease in gas velocity decreases the venturi aspiration rate, decreasing the liquid recycle rate, thus keeping the liquid/gas ratio within substantially constant limits, independent of tower throughput.

SPECIFIC EXAMPLE 3

In this test, the high-recycle capacity apparatus of Example 2 was used for a test of an anisotropic layered mesh flow-restrictive barrier array. The foraminous Vexar spray interceptor tube bank was replaced with 7 double layers of knitted and crimped 11-mil stainless steel wire mesh, having an original 12 pound per cubic foot density. The layers were arranged so that the crimp in alternate layers was reversed, giving higher void passages in the horizontal direction than that within the mesh layer itself, thus providing a pad having anisotropic flow resistance properties. That is, the flow resistance of the pad was less in the horizontal direction than it was in the vertical direction. The mesh interlayer horizontal passages were open to the sides of the pad and were substantially equally distributed on all four sides of the mesh pad. The mesh was mounted between polypropylene grids, ⅛ thick, having ½×½ openings, in place of the spray interceptor tubes of Example 2, on top of the vertical housing.

At a liquid throughput of 1.0 GPM, and a liquid level on the tray even with the overflow pipe, the gas flow velocity in the vertical housing was varied from 375 to 505 fpm, corresponding to pressure drops of 1.8 and 2.0" W.C., respectively. Liquid recycle spray was observed to be ejected from all sides of the mesh at apparently equal and extremely high rates of flow. It was also apparent that the spray generated between the venturi tubes was being coalesced and regenerated by the successive layers of the mesh pad. Visual inspection showed that the lateral liquid flow was issuing between all layers of the pad. Comparison with the test data of Example 2 indicated that the recycle spray flow from the mesh was in the range of 5 to 10 GPM.

The apparatus of this invention provides for a cyclic process of spray generation, collection, regeneration and direction in a controlled manner. Modifications of the method of invention, described above, can effect selected variation in liquid recycle ratio, recycle loop retention time, and liquid recycle direction on the contact tray. The ready achievement of non-random spray recycle rates at high ratios to tray liquid throughput shown by the test results indicates the utility and potential of the apparatus and method of invention.

The allowable gas velocity of conventional sieve or bubble cap tray units is typically in the 50–200 fpm air equivalent linear velocity range. As indicated by the linear gas velocity of 1200 fpm in the Specific Example 2, the velocity range in the method of this invention in employing the contactor tray of the invention is very much greater than for conventional mass transfer methods. The gas treatment capacity for a given flow cross-section of the apparatus of this invention is accordingly several hundred percent greater than for conventional liquid-gas contact apparatus. Further, the pressure drop of 1.3 inches W.C. at the 715 fpm linear air velocity in Specific Example 1, and the 4" W.C. pressure drop at 1200 fpm linear air velocity in Specific Example 2, demonstrates a comparatively low pressure drop characteristic for the apparatus of this invention at high linear gas velocities. This low energy demand for the gas flow derives from the absence of a hydrostatic liquid head resisting gas flow in the apparatus of this invention, compared to the existence of such hydrostatic heads in conventional bubble cap and sieve tray contactors. The spray recycle ratio is a function of the gas velocity; the recycle ratio and the generation of new interfacial contact area increase as the gas velocity increases, thus maintaining or increasing the mass transfer efficiency of the apparatus of this invention with increasing gas flow, which is a unique and surprising feature.

I claim:

1. Gas-Liquid contact apparatus consisting of a vertically disposed vessel containing at least one horizontal tray, means for introducing liquid to, and removing overflow from, the tray, and at least one vertically arranged housing thereon that is open to gas flow at top and bottom, the housing enclosing a horizontally disposed array of liquid conductors in substantially parallel arrangement at the level of the tray and so spaced apart as to effect constricted venturi passages for the upward flow of the gas therebetween, said conductors having means for delivery therefrom of liquid from the tray into the gas; an disposed upon and supported on and occupying the cross-sectional area of said housing, flow-resistant elements comprises of anisotropic layered material having low flow resistance in the horizontal direction relative to the flow resistance in the vertical direction, said anisotropic layered material having edges open to the volume between the vessel and the housing.

2. The apparatus of claim 1 in which the flow-restrictive elements are comprised of knitted mesh layers.

3. The apparatus of claim 1 in which the flow-restrictive elements are comprised of layers of woven screen.

4. The apparatus of claim 1 in which the vertically disposed vessel contains a number of the said horizontal trays, one above the other, each having a vertical housing enclosing at the level of the tray the said liquid conductors and, supported on each vertical housing, the said flow-restrictive elements, and means for feeding liquid to each tray and removing overflow liquid from each tray.

5. A method of mass transfer of substances between a liquid and a gas comprising the steps of: introducing liquid at a pre-determined rate to a tray containing liquid-conducting tubes so spaced apart to induce gas venturi flow, passing a gas upward between the tubes, aspirating liquid from orifices in the tubes by gas venturi aspiration at a rate that is many time greater than the initial rate of introduction of liquid to the tray, effecting thereby a cocurrent spray of liquid in the gas; passing the gas and contained spray through a first flow-restrictive element which partially coalesces and regenerates the spray; passing the gas and regenerated spray into a relatively high-voidage volume between the first flow-restrictive element and a secondary flow-restrictive element, thereby causing the gas and spray to flow laterally through the high voidage volume between the elements; collecting spray and gas discharged from the high voidage volume and separating the spray by impingement on a plane surface and causing the liquid therefrom to recycle into cocurrent spray contact with a further quantity of the gas at a liquid rate that is many times higher than the initial pre-determined rate of liquid introduction to the tray; withdrawing so-treated liquid from ultimate contact with inflowing gas and so-treated gas from contact with inflowing liquid.

* * * * *